US008380743B2

(12) United States Patent
Convertino et al.

(10) Patent No.: US 8,380,743 B2
(45) Date of Patent: Feb. 19, 2013

(54) SYSTEM AND METHOD FOR SUPPORTING TARGETED SHARING AND EARLY CURATION OF INFORMATION

(75) Inventors: Gregorio Convertino, Palo Alto, CA (US); Ed H. Chi, Palo Alto, CA (US); Benjamin Vincent Hanrahan, Blue Ridge, VA (US); Nicholas Chi-Yuen Kong, Berkeley, CA (US); Guillaume Bouchard, Saint-Martin-le-Vinoux (FR); Cedric Philippe C. J. G. Archambeau, Grenoble (FR)

(73) Assignees: Palo Alto Research Center Incorporated, Palo Alto, CA (US); Xerox Corporation, Norwalk, CT (US)

( * ) Notice: Subject to any disclaimer, the term of this patent is extended or adjusted under 35 U.S.C. 154(b) by 172 days.

(21) Appl. No.: 12/940,939

(22) Filed: Nov. 5, 2010

(65) Prior Publication Data

US 2012/0117115 A1    May 10, 2012

(51) Int. Cl.
*G06F 17/30* (2006.01)
(52) U.S. Cl. ...................................... 707/780
(58) Field of Classification Search .............. 707/2, 780; 715/234; 345/592
See application file for complete search history.

(56) References Cited

U.S. PATENT DOCUMENTS

| 2006/0004703 | A1 | 1/2006 | Spivack et al. |
| 2009/0063953 | A1* | 3/2009 | Kraus et al. .................. 715/234 |
| 2010/0110099 | A1* | 5/2010 | Averett et al. ................. 345/592 |

OTHER PUBLICATIONS

Tim O'Reilly, "What is Web 2.0: Design Patterns and Business Models for the Next Generation of Software," Communications and Strategies, Iss. 65, pp. 17-37 (Quarter 1, 2007).
Palen et al., "Discretionary Adoption of Group Support Software: Lessons from Calendar Applications," Implementing Collaboration Technologies in Industry: Case Examples and Lessons Learned, pp. 159-179, Springer-Verlag London, UK (2003).
Pirolli et al., "The Sensemaking Process and Leverage Points for Analyst Technology as Identified Through Cognitive Task Analysis," Proceedings of the 2005 International Conference on Intelligence Analysis, (May 2-4, 2005).
Preece et al., "The Reader-to-Leader Framework: Motivating Technology Mediated Social Participation," AIS Transactions on Human-Computer Interaction, vol. 1, Iss. 1, pp. 13-32 (Spring 2009).
Robertson et al., "Simple BM25 Extension to Multiple Weighted Fields," Proceedings of the 13th ACM International Conference on Information and Knowledge Management, pp. 42-49 (Nov. 2004).

(Continued)

*Primary Examiner* — Etienne Leroux
(74) *Attorney, Agent, or Firm* — Patrick J. S. Inouye; Krista A. Wittman; Leonid Kisselev

(57) ABSTRACT

A system and method for supporting targeted sharing and early curation of information is provided. A digital data item selection by a user within a personal information management client is identified. One or more documents in a shared information repository similar to the digital data item are recommended including selecting recommendation criteria. The recommendation criteria are applied to the digital data item and the one or more documents. The one or more documents satisfying the recommendation criteria are identified as the similar documents. The similar documents are displayed visually proximate to the digital data item in the personal information client. A selection of one of the similar documents is received and the selected similar document in the shared information repository is updated with the digital data item.

20 Claims, 9 Drawing Sheets

OTHER PUBLICATIONS

Rosenblatt, Frank, "The Perceptron: A Probabilistic Model for Information Storage and Organization in the Brain," Psychological Review, vol. 65, No. 6, pp. 386-408 (Nov. 1958).
Sauper et al., "Automatically Generating Wikipedia Articles: A Structure-Aware Approach," Proceedings of the Joint Conference of the 47th Annual Meeting of the ACL and the 4th International Joint Conference on Natural Language Processing of the AFNLP, vol. 1, pp. 208-216 (Aug. 2009).
Stasko et al., "Jigsaw: Supporting Investigative Analysis Through Interactive Visualization," Information Visualization, vol. 7, No. 2, pp. 118-132 (Summer 2008).
Steecher et al., "Salsa: Leveraging Email to Create a Social Network for the Enterprise," Proceedings of the Third International Conference on Weblogs and Social Media, pp. 323-326 (May 2009).
Suh et al., "Lifting the Veil: Improving Accountability and Social Transparency in Wikipedia with WikiDashboard," Proceedings of the 26th Annual SIGCHI Conference on Human Factors in Computing Systems, pp. 1037-1040 (Apr. 2008).
Talbot et al., "EnsembleMatrix: Interactive Visualization to Support Machine Learning with Multiple Classifiers," Proceedings of the 27th International Conference on Human Factors in Computing Systems, pp. 1283-1292 (Apr. 2009).
Whittaker et al., "ContactMap: Organizing Communication in a Social Desktop," ACM Transactions on Computer-Human Interaction, vol. 11, No. 4, pp. 445-471 (Dec. 2004).
Whittaker et al., "The Dynamics of Mass Interaction," Proceedings of the 1998 ACM Conference on Computer Supported Cooperative Work, pp. 257-264 (Nov. 1998).
Whittaker et al., "Email Overload: Exploring Personal Information Management of Email," Proceedings of the AMC CHI Conference on Human Factors in Computing Systems, pp. 276-283 (Apr. 1996).
Steve Whittaker, "Supporting Collaborative Task Management in Email," vol. 20, Iss. 1, pp. 49-88 (Jun. 2005).
Dennis Wilkinson, "Strong Regularities in Online Peer Production," Proceedings of the 9th ACM Conference on Electronic Commerce, pp. 302-309 (Jul. 2008).
Witte et al., "Connecting Wikis and Natural Language Processing Systems," Proceedings of the 2007 International Symposium on Wikis, pp. 165-176 (Oct. 2007).
Jeffrey Heer, http://flare.prefuse.org/, Sep. 2010 (Last Accessed Nov. 4, 2010).
Intraspect: http://tomgruber.org/technology/intraspect.htm, May 27, 2009 (Last Accessed Nov. 4, 2010).
Topika: http://www.almaden.ibm.com/cs/disciplines/user/interns/2010/#topika, (Last Accessed Nov. 4, 2010).
Adamic et al., "Knowledge Sharing and Yahoo Answers: Everyone Knows Something," Proceedings of the 17th International World Wide Web Conference, pp. 665-674 (Apr. 2008).
Adar et al., "Zoetrope: Interacting with the Ephemeral Web," Proceedings of the 21st Annual ACM Symposium on User Interface Software and Technology, pp. 239-248 (Oct. 2008).
Balakrishnan et al., "Fitting an Activity-centric System into an Ecology of Workplace Tools," Proceedings of the 28th International Conference on Human Factors in Computing Systems, pp. 787-790 (Apr. 2010).
Berners-Lee et al., "The Semantic Web," Scientific American, vol. 284, No. 5, pp. 34-43 (May 17, 2001).
Bier et al., "Entity Workspace: An Evidence File that Aids Memory, Inference, and Reading," Proceedings of the IEEE International Conference on Intelligence and Security Informatics, pp. 466-472 (May 2006).
Blei et al., "Latent Dirichlet Allocation," Journal of Machine Learning Research, vol. 3, pp. 993-1022 (Jan. 2003).
Brzozowski et al., "Effects of Feedback and Peer Pressure on Contributions to Enterprise Social Media," Proceedings of the ACM 2009 International Conference on Supporting Group Work, pp. 61-70 (May 2009).
Michel Buffa, "Intranet Wikis," Proceedings of the Intraweb Workshop, Proceedings of the 15th International World Wide Web Conference, ACM Press (May 2006).

Chan et al., "Vispedia: On-demand Data Integration for Interactive Visualization and Exploration," Proceedings of the 35th SIGMOD International Conference on Management of Data, pp. 1139-1142 (Jun. 29 to Jul. 2, 2009).
Convertino et al., "Designing for Learning Communities in a Large Enterprise," ACM CSCW 2010 Workshop on Collective Intelligence in Organizations: Towards a Research Agenda, (Feb. 2010).
Cselle et al., "BuzzTrack: Topic Detection and Tracking in Email," Proceedings of the 2007 International Conference on Intelligent User Interfaces, pp. 190-197 (Jan. 2007).
Cunningham et al., "GATE: A Framework and Graphical Development Environment for Robust NLP Tools and Applications," Proceedings of the 40th Anniversary Meeting of the Association for Computational Linguistics, pp. 168-175 (Jul. 2002).
Dork et al., "VisGets: Coordinated Visualizations for Web-based Information Exploration and Discovery," IEEE Transactions on Visualization and Computer Graphics, vol. 14, No. 6, pp. 1205-1212 (Nov./Dec. 2008).
Ducheneaut et al., "E-mail as Habitat: An Exploration of Embedded Personal Information Management," Interactions, vol. 8, Iss. 5, pp. 30-38 (Sep./Oct. 2001).
Dugan et al., "Lessons Learned from Blog Muse: Audience-Based Inspiration for Bloggers," Proceedings of the 28th International Conference on Human Factors in Computing Systems, pp. 1965-1974 (Apr. 2010).
Efimova et al., "Crossing Boundaries: A Case Study of Employee Blogging," Proceedings of the 40th Hawaii International Conference on System Sciences, IEEE Computer Society, Washington D.C., 86 (Jan. 2007).
Farzan et al., "Mobilizing Lurkers with a Targeted Task," Proceedings of the Fourth International Conference on Weblogs and Social Media, pp. 101-109 (May 2010).
Faulring et al., "Agent-Assisted Task Management that Reduces Email Overload," Proceedings of the 2010 International Conference on Intelligent User Interfaces, pp. 61-70 (Feb. 2010).
Fernandes et al., "An Ontology-Based Approach for Organizing, Sharing, and Querying Knowledge Objects on the Web," Proceedings of the 14th International Workshop on Database and Expert Systems Applications, pp. 604-609 (Sep. 2003).
Findlater et al., "Ephemeral Adaptation: The Use of Gradual Onset to Improve Menu Selection Performance," Proceedings of the 27th International Conference on Human Factors in Computing Systems, pp. 1655-1664 (Apr. 2009).
Golder et al., "Usage Patterns of Collaborative Tagging Systems," Journal of Information Science, vol. 32, Iss. 2, pp. 198-208 (Apr. 2006).
Guo et al., "Compoweb: A Component-Oriented Web Architecture," Proceedings of the 17th International World Wide Web Conference, pp. 545-554 (Apr. 2008).
Happel, Hans-Jörg, "Social Search and Need-Driven Knowledge Sharing in Wikis with Woogle," Proceedings of the 5th International Symposium on Wikis and Open Collaboration, Art. No. 13 (Oct. 2009).
Hoffart et al., "An Architecture to Support Intelligent User Interfaces for Wikis by means of Natural Language Processing," Proceedings of the 5th International Symposium on Wikis and Open Collaboration, Art. No. 12 (Oct. 2009).
Hoffmann et al., "Amplifying Community Content Creation with Mixed Initiative Information Extraction," Proceedings of the 27th International Conference on Human Factors in Computing Systems, pp. 1849-1858 (Apr. 2009).
Holtzblatt et al., "Factors Impeding Wiki Use in the Enterprise: A Case Study," Proceedings of the 28th International Conference Extended Abstracts on Human Factors in Computing Systems, pp. 4661-4676 (Apr. 2010).
Eric Horvitz, "Principles of Mixed-Initiative User Interfaces," Proceedings of the SIGCHI Conference on Human Factors in Computing Systems: the CHI is the Limit, pp. 159-166 (May 1999).
Kittur et al., "Power of the Few Versus Wisdom of the Crowd: Wikipedia and the Rise of the Bourgeoisie," ALT.CHI at CHI 2007 (Apr. 2007).

Kong et al., "VisualWikiCurator: Human and Machine Intelligence for Organizing Wiki Content," Proceedings of the 16th International Conference on Intelligent User Interfaces, pp. 367-370 (Feb. 2011).

Krämer, Jan-Peter, "PIM-Mail: Consolidating Task and Email Management," Proceedings of the 28th International Conference Extended Abstracts on Human Factors in Computing Systems, pp. 4411-4416 (Apr. 2010).

Krieger et al., "Coordinating Tasks on the Commons: Designing for Personal Goals, Expertise and Serendipity," Proceedings of the 27th International Conference on Human Factors in Computing Systems, pp. 1485-1494 (Apr. 2009).

Kriplean et al., "Articulations of Wikiwork: Uncovering Valued Work in Wikipedia Through Barnstars," Proceedings of the 2008 ACM Conference on Computer Supported Cooperative Work, pp. 47-56 (Nov. 2008).

Majchrzak et al., "Corporate Wiki Users: Results of a Survey," Proceedings of the 2006 International Symposium on Wikis, pp. 99-104 (Aug. 2006).

Matt McKeon, "Harnessing the Web Information Ecosystem with Wiki-based Visualization Dashboards," IEEE Transactions on Visualization and Computer Graphics, vol. 15, No. 6, pp. 1081-1088 (Nov./Dec. 2009).

Matthews et al., "Collaboration Personas: A Framework for Understanding & Designing Collaborative Workplace Tools," ACM CSCW 2010 Workshop on Collective Intelligence in Organizations: Towards a Research Agenda (Feb. 2010).

Muller et al., "Information Curators in an Enterprise File-sharing Service," Proceedings of the Eleventh European Conference on Computer-Supported Work, pp. 403-412 (Sep. 2009).

Nakanishi et al., "SAVVY Wiki: A Context-Oriented Collaborative Knowledge Management System," Proceedings of the 5th International Symposium on Wikis and Open Collaboration, Art. No. 6 (Oct. 2009).

Nardi et al., "Collaborative, Programmable Intelligent Agents," Communications of the ACM, vol. 41, No. 3, pp. 96-104 (Mar. 1998).

Nelson et al., "Mail2tag: Efficient Targeting of News in an Organization," ACM CSCW 2010 Workshop on Collective Intelligence in Organizations: Towards a Research Agenda (Feb. 2010).

Apple Data Detector: http://macbiblioblog.blogspot.com/2008/02/apple-data-detectors-are-so-useful.html, Feb. 12, 2008 (Last Accessed Nov. 4, 2010).

* cited by examiner

Algorithms

- Multi-Document Summarization by Maximizing Informative Content-Words [7]
  o *We show that a simple procedure based on maximizing the number of informative content-words can produce some of the best reported results for multi-document summarization. We first assign a score to each term in the document cluster, using only frequency and position information, and then we find the set of sentences in the document cluster that maximizes the sum of these scores, subject to length constraints.*
  o *Evaluation was ISR method of comparing results of different methods on static corpus*
- Mining social networks to prioritize e-mail messages [8]
  o *ISR study on leveraging social networks for more informative email presentations*
  o *Somewhat marginally important to use but has some interesting information on measuring*

FIG. 6

SYSTEM AND METHOD FOR SUPPORTING TARGETED SHARING AND EARLY CURATION OF INFORMATION

FIELD

This application relates in general to collaborative information sharing, and in particular, to a system and method for supporting targeted sharing and early curation of information.

BACKGROUND

Sharing of information within an organization, such as a corporation, is important to remain competitive in the global economy. The problem of efficient and timely information sharing increases as a corporation grows in size as workers become increasingly specialized and as geographical separation within an organization increases. Valuable information can include project updates and deadlines, answers to frequently asked questions, and competitive intelligence.

Currently, email is the primary manner for knowledge sharing by workers as email is their primary work environment. Although email was designed for asynchronous communication, knowledge workers utilize email for many purposes beyond this original intended use. Workers use email for sharing files, managing tasks, updates, notifications, and many other purposes. Unfortunately, this repurposing of email can lead to email overload. Additionally, content duplication with unmanaged or outdated version of documents often occurs. Moreover, useful knowledge can remain siloed in individual email inboxes, which function as personal information repositories, making reuse and sharing of the information difficult across organizations. Email is not an optimal tool for building and maintaining a group knowledge base.

Wikis have been deployed in corporate environments to encourage employees to share knowledge at a centralized location. Wikis allow for developing and organizing valuable knowledge through collaborative authoring tools. Despite their wide deployment, wikis have been slow to be adopted by workers due to high interaction costs in time involved in contributing to, and organizing, wiki content. The low adoption rate prevents wikis from reaching a critical mass needed to become a valuable tool for knowledge sharing. Typically, to add content to a wiki, a worker has to undertake a multi-step process including retrieving the correct uniform resource locator from multiple potential relevant wikis, remembering any necessary login information, opening the correct wiki editor in a Web browser, switching to the source of the content to be added, such as an email client, copying the content, switching back to the wiki editor, finding the appropriate portion of the wiki to add the content, and pasting the copied content to the section. The greater number of interaction steps, information channels to manage, and context switches required from workers is one of the main reasons that most knowledge sharing continues to occur via email.

Some conventional tools support collaborative activities around email. For example, Xobni, licensed by Xobni Corporation, provides enhanced search and people-based navigation of email archives. Information about email contacts is pulled from outside sources, such as social networks, and displayed to the users. However, the information is only pulled into the email client and no accommodations are made to transfer information from the email client to the outside sources, leaving the information siloed within the email client.

Other tools connect email to web repositories. For example, Topika, available at http://www.almaden.ibm.com/cs/disciplines/user/interns/2010/#topika, is a prototype Web-based tool that provides a shared inbox. Email messages are archived and organized into threads. New threads can be generated by sending emails from a regular email client to the tool's email address. However, information cannot directly be transferred to the tool within the regular email client context. Further, the emailed information added to the tool is unstructured. Similarly, Intraspect, available at http://tomgruber.org/technology/intraspect.htm, provides for user contribution to a shared workspace. Information can be added by emailing the workspace. However, the information is unstructured and the user is not provided with an interactive overview of the existing content of the workspace to aid in placement and organization of information.

Accordingly, there is a need for integrating shared information repositories within the context of traditional personal information tools while allowing for early curation and organization of information through targeted sharing.

SUMMARY

Target and source content are analyzed. Target content from a shared information repository is identified as similar to selected source content and displayed in the context of the source content. The selected source content can be directly added to the target within the source content context.

An embodiment provides a system and method for supporting targeted sharing and early curation of information. A digital data item selection by a user within a personal information management client is identified. One or more documents in a shared information repository similar to the digital data item are recommended including selecting recommendation criteria. The recommendation criteria are applied to the digital data item and the one or more documents. The one or more documents satisfying the recommendation criteria are identified as the similar documents. The similar documents are displayed visually proximate to the digital data item in the personal information client. A selection of one of the similar documents is received and the selected similar document in the shared information repository is updated with the digital data item.

A further embodiment provides a system and method for targeted sharing of information from an email message. An email message selected by a user from an email message storage associated with an email client application is identified. A recommendation of one or more wiki pages is provided for the email message. Similarity measures are determined for each of the email message and the one or more wiki pages. The similarity measures of the email message and the one or more wiki pages are compared against recommendation criteria. The one or more wiki pages satisfying the recommendation criteria are identified as the recommended wiki pages. The recommended wiki pages are displayed visually proximate to the email message in the email client application. A selection of one of the recommended wiki pages is received from the user. The selected wiki page in the shared storage is updated with the email message.

Still other embodiments of the present invention will become readily apparent to those skilled in the art from the following detailed description, wherein is described embodiments of the invention by way of illustrating the best mode contemplated for carrying out the invention. As will be realized, the invention is capable of other and different embodiments and its several details are capable of modifications in various obvious respects, all without departing from the spirit and the scope of the present invention. Accordingly, the draw-

BRIEF DESCRIPTION OF THE DRAWINGS

FIG. 6 is a screen shot diagram showing, by way of example, a user interface upon user selection of target content.

DETAILED DESCRIPTION

High user transaction costs for interacting with a shared information repository, such a wiki, has resulted in low user adoption rates. Providing suggested target content in context with selected source content provides an environment for efficient and minimized user interaction requirements. Direct user transfer and curation, or organization, of source content into target content within existing workflows encourages user contribution to the shared information repository. Such an approach facilitates reuse of source content currently locked in personal silos across an organization of knowledge workers while not disrupting the existing workflows.

Although, as discussed herein, the terms source content and email message and target content and wiki page, respectively, are used interchangeably, source content includes a wide class of data digital items and target content includes a variety of Web-based tools that enable publishing, modifying, and organizing of the digital data items. For example, the source content, or class of digital data items, can include structured data items such as email messages, web feed items in Really Simple Syndication (RSS) or Atom formats, chat or Instant Messaging messages, status updates from social networking sites, web forum or blog posts, and microblogging, for example Twitter, messages. These and other similar digital data items are partially-structured messages that have in common the properties of including general metadata attributes such as author, timestamp, and message body, and, optionally, metadata attributes that are can be specific to the medium such as message title or subject, tags, and recipients. While the embodiments described herein consider the specific example of email messages, the embodiments equally apply to this more general class of data items.

Additionally, target content, or the class of web-based tools, includes shared information repositories accessible via a network, such as the Internet or a local intranet. Target content includes tools such as wikis, blogs and discussions forums, Q&A sites, and idea management systems. These and other similar Web-based tools share the properties of allowing a user to add, remove, or edit a data item, such as documents, in the repository, allowing multiple users to collaboratively edit the content in the repository, and allowing simple forms of organization and browsing of the content in the repository, for example, by pages and sections in wikis, thorough threads in blogs and forums, or using tags. The organization and browsing functions are enabled by exploiting the metadata attributes associated with the data items in the repository. While the embodiments described herein consider Wikis as a specific example of shared information repository, the embodiments equally apply to this more general class of Web-based tools with sharing, editing, and organization functions.

Figure 1:
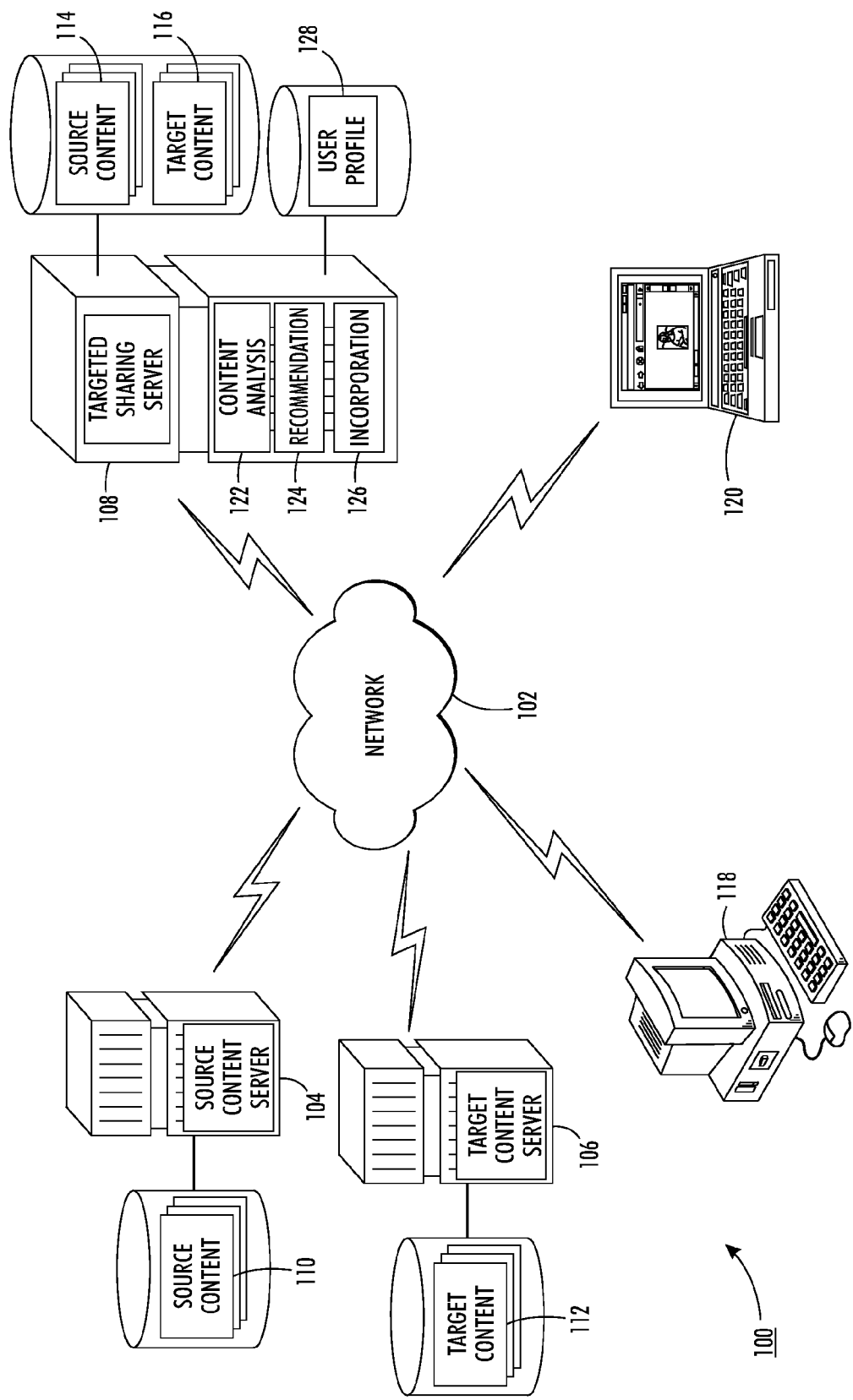
FIG. 1 is a block diagram showing a system 100 for supporting targeted sharing and early curation of information, in accordance with one embodiment.

Selected source content is transferred to target content in a shared information repository through direct user manipulation. FIG. 1 is a block diagram showing a system 100 for supporting targeted sharing and early curation of information, in accordance with one embodiment. A digital data communications network 102, such as the Internet or a local intranet, provides an infrastructure for exchange of digital information. Other digital information exchange infrastructures, for instance, a non-public corporate enterprise network, are possible. The network 102 provides interconnectivity to diverse and distributed information, or content, sources and users that respectively supply and consume the digital information. Users can access and upload content, such as emails, Web pages, posted articles, and the like to the network 102, which are maintained as a distributed data corpus through one or more content servers 104, target content servers 106, targeted sharing servers 108, and other data repositories that serve as content sources. These sources respectively serve content 110, 112, 114, 116 and other information to users that access the network 102 through one or more user devices 118, 120. User devices can include desktop personal computers 118, laptop personal computers 120, and handheld devices, such as mobile telephones and mobile Internet devices (not shown).

Content 110, 112, 114, 116 is created by users or automatically generated, and can include emails, news content, wiki pages, and documents in content management systems. Other types of content 110, 112, 114, 116 are possible. Content 110, 112, 114, 116 can be received directly on user devices 118, 120, for user review via a user interface from a source server 106 or content from many sources can be aggregated, cached, and accessed by user devices 118, 120, from other servers 104. Generally, source content 110, 114 is from a personal information repository, such as email messages from an email storage, while target content 112, 116 is from a shared information repository, such as wiki pages from an enterprise wiki. Other types of content are possible. In a further embodiment, the target content 112, 116 is an information repository that is not collaborative, such as personal wiki of a user. Source content 110, 114 is displayed within, and shared to the target content 112, 116, from, a personal information management client. Personal information management clients can include email clients, microblogging aggregator clients, RSS feed aggregators. Other personal information management clients are possible.

A user selects source content 110, 114 displayed on a user device 118, 120. For example, source content can be an email message, or a portion thereof, displayed within an email client. Subsequently, a targeted sharing server 108 identifies target content, such as wiki page, similar to the selected source content and integrates the source content 110, 114 into the target content 112, 116 under user control. The targeted sharing server 108 is interconnected to the user devices 118, 120, target content server 106, and source content server 104 via the network 102, and includes a content analysis module 122, a recommendation module 124, and an incorporation module 126. The source content 110, 114 and target content 112, 116 can be retrieved, analyzed, indexed, and cached for later retrieval by the targeted sharing server 108. The source content 110, 114 can be obtained directly from the personal information repository, retrieved from a cached copy, or generated by the user on a the user device 118, 120. Likewise, the target content 112, 116 can be obtained directly from the target content server 106 or crawled, analyzed, and cached for later retrieval by the targeted sharing server 108.

The content analysis module 122 analyzes the content of the source content 110, 114 and target content 112, 116, including parsing the content using text mining and entity, including metadata, extraction. Once source content 110, 114 is selected, the recommendation module 124 identifies target content 112, 116 similar to the selected source content 110, 114 and displays the identified target content as a recommended target for the selected source content 110, 114, as further described below with reference to FIG. 3.

After the user has decided where to place the source content 110, 114 within the target content 112, 116, the incorporation module 126 supports direct user manipulation of the source content 110, 114 within the target content 112, 116. For example, the user can drag and drop the selected source content 110, 114 directly into the displayed target content 112, 116 from within the target content 110, 114 context. The selected source content 110, 114 and the existing target content 112, 116 can then be edited or otherwise curated by the user. Once finalized the user can confirm the changes to the target content, 112, 116, which is then reflected in the target content 112, 116 to other users.

The recommendations are displayed to the user within the context of the selected source content 110, 114. In one embodiment, the recommendations are displayed within an additional window of an email client, such as Microsoft Outlook, licensed by Microsoft Corporation, via an email plugin, as described further below with reference to FIGS. 4-10. The email messages within the email client are the source content 110, 114, while wiki pages are the target content 112, 116. Users can directly target selected email content into recommended wiki pages within the email client.

Additionally, a user profile 128 is generated and stored for each user. The user profile 128 stores user preference information such as user account and profile information, access control settings, session data, and preferences such as preselected, or favorite, target content 112,116. The user profile can also store contextual information for each user interaction across the source content 110, 114 and target content 112, 116. For example, whether a user utilizes recommended target content 112, 116 for insertion of selected source content 110, 114 is identified, stored, and used to adapt later recommendations to prefer the user target content 112, 116 selected by the user for adding similar selected source content 110, 114 in the future, as further discuss below with reference to FIG. 3.

In general, each user device 118, 120, is a Web-enabled device that executes an email client, Web browser, or similar application, which supports interfacing to and information exchange and retrieval with the servers 104, 106, 108. Both the user devices 118, 120, and servers 104, 106, 108, include components conventionally found in general purpose programmable computing devices, such as a central processing unit, memory, input/output ports, network interfaces, and non-volatile storage, although other components are possible. The devices 104, 106, 108, 118, 120, can include one or modules for carrying out the embodiments disclosed herein.

The modules can be implemented as a computer program or procedure written as source code in a conventional programming language and presented for execution by the central processing unit as object or byte code. Alternatively, the modules could also be implemented in hardware, either as integrated circuitry or burned into read-only memory components. The various implementations of the source code and object and byte codes can be held on a computer-readable storage medium, such as a floppy disk, hard drive, digital video disk (DVD), random access memory (RAM), read-only memory (ROM) and similar storage mediums. Other types of modules and module functions are possible, as well as other physical hardware components. Moreover, other content sources in lieu of or in addition to the servers 104, 106, and other devices, in lieu of or in addition to user devices 116, 118, are possible.

Figure 2:
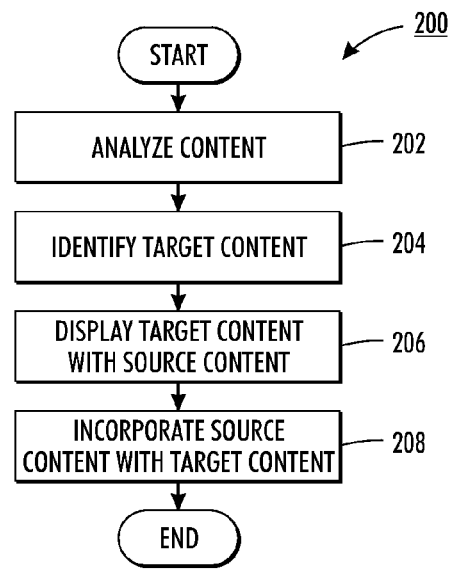
FIG. 2 is a flow diagram showing a method for supporting targeted sharing and early curation of information, in accordance with one embodiment.

Target content 112, 114 is displayed and manipulated directly within the context of source content 110, 114. FIG. 2 is a flow diagram showing a method for supporting targeted sharing and early curation of information, in accordance with one embodiment. Content 110, 112, 114, 116 is received from content sources 104, 106, 108. Source content 110, 114 can be received from a personal information repository, such as a source content server 104 or targeted sharing server 108. Target content 112, 116 can be received from a shared information repository, such as a target content server 106 or targeted sharing server 108. Other ways of receiving content 110, 112, 114, 116 are possible.

Source content 110, 114 is selected by the user and then analyzed by the system 100 (block 202). The source content 110, 114 can consist of an individual item of content, such a single email message, or multiple items, such as multiple emails messages. Other types of source content 110, 114 are possible. Alternatively, source content can be analyzed by the system 100 prior to user selection. For example, email messages can be analyzed as they are received by the user through the email client.

In addition to source content 110, 114, target content 112, 116 is analyzed for later comparison. In one embodiment, the content 110, 112, 114, 116 is analyzed using textual, or other content, mining, such as categorization, clustering, concept and entity extraction, document summarization, temporal reasoning or author-recipient relationships computation. For example, the frequency of terms within the content can be determined using term frequency-inverse document frequency (tf-idf) or Okapi BM25. The content analysis is then stored by the targeted sharing server 103. A user can select previously created source content 110, 114 or create new source content 110, 114, such as composing an outgoing email, which is then dynamically analyzed.

Target content 112, 116 similar to the selected source content 110, 114 is identified (block 204) based on recommendation criteria. In one embodiment, relevant target content 112, 116 and specific portions of target content 112, 116 can be identified and recommended to the user based on the similarity of the analyzed selected source content 110, 114 and target content 112, 116. For example, tf-idf or BM25 can be used in conjunction with a standard vector space model together with cosine similarity to determine the similarity between the source content 110, 114 and the target content 112, 116. Other automated determinations of similarity are possible. For example, advanced text similarity computation could be used, such as the distance between low-dimensional representations of the documents computed using Latent Semantic Indexing, Probabilistic Semantic Indexing or Latent Dirichlet Allocation inference algorithms.

In one embodiment, the target content 112, 116 identified as most similar to the source content 110, 114 is recommended. For example, the three wiki pages identified that are most similar to a selected email message are recommended to the user. In a further embodiment, the target content 112, 115 must meet a threshold, such as percentage of similarity with the source content 110, 114, to be recommended. For example, the threshold can be set by computing the probability of being relevant content and accepting the recommendation if the probability is higher than 50. Other recommendation criteria are possible.

Multiple levels of recommendations can be given based on user action. For example, a user can select an email message and then receive recommendations as to most relevant wiki pages based on the content of the entire message. Additionally, if a user selects particular potions of the email message, the most relevant section within the wiki page is displayed. Most relevant represents the target content most likely to be selected by the user based on recommendation criteria. The recommendations can be improved over time based on implicit feedback from user actions on the recommendations, as further described below with reference to FIG. 3. In a further embodiment, preselected target content 112, 116, such as one or more wiki page favorites, is identified and displayed as recommended target content 112, 116 based on user preference and saved as preferred target content 112, 116 in the user's profile 126.

The identified target content 112, 116 is displayed with the context of the source content 110, 114 (block 206). The recommended Wiki page and section are displayed to the user so the user can directly contribute the source content 110, 114 to the target content 112, 116 without switching display contexts, as described further below beginning with FIG. 4. For example, wiki page target content 112, 116 is displayed within an email client, such as Microsoft Outlook, via an email plugin or extension. In one embodiment, an outline view of the headings of the target content 112, 116 is displayed. The user can then drill down into the wiki page by selecting, or hovering or mousing over, a heading to view more target content 112, 116 on the wiki page in more detail. In a further embodiment, the entire contents of the target are automatically displayed.

The selected source content 110, 114 can then be incorporated into the target content 112, 116 (block 208). The user can directly add the source content 110, 114 to the target content 112, 116 through manipulation of the user interface. For example, after selecting content 110, 114 from an email message, the user can drag the source content 110, 114 to the displayed target content 112, 116, and drop the source content 110, 114 under the heading desired. The user can then edit, reformat, reposition, or otherwise change the source content 110, 114 before confirming placement of the source content 110, 114. If the user selects multiple emails as source content 110, 114, the multiple emails can be incorporated into the target content 112, 116 as a batch or group. Additionally, a new section heading or new page, including adding a title, can be created within the target content 112, 116 by the user and the source content 110, 114 added accordingly. The new section or page is created through user selection of an appropriate control, such as user interface button, and providing the name of the section or page. Once confirmed, the source content 110, 114 is added to the target content 112, 116 and the wiki page displays the added content to all users, as described further below with reference to FIG. 9.

In a further embodiment, source content 110, 114 can be contributed to target content 112, 116 asynchronously by emailing selected source content 110, 114 to an email address associated with a target wiki page, such as described in commonly-assigned U.S. patent application, entitled "System and Method for Content Tagging and Distribution Through Email," Ser. No. 12/699,791, filed Feb. 3, 2010, pending, the disclosure of which is incorporated by reference. Prior to adding the source content 110, 114 to the target content 112, 116 the user receives a feedback email message. The feedback message allows a user to review, accept, or cancel the proposed contribution. The user can contribute a portion of or and entire email message or a group of email messages to the target content 112, 116.

Figure 3:
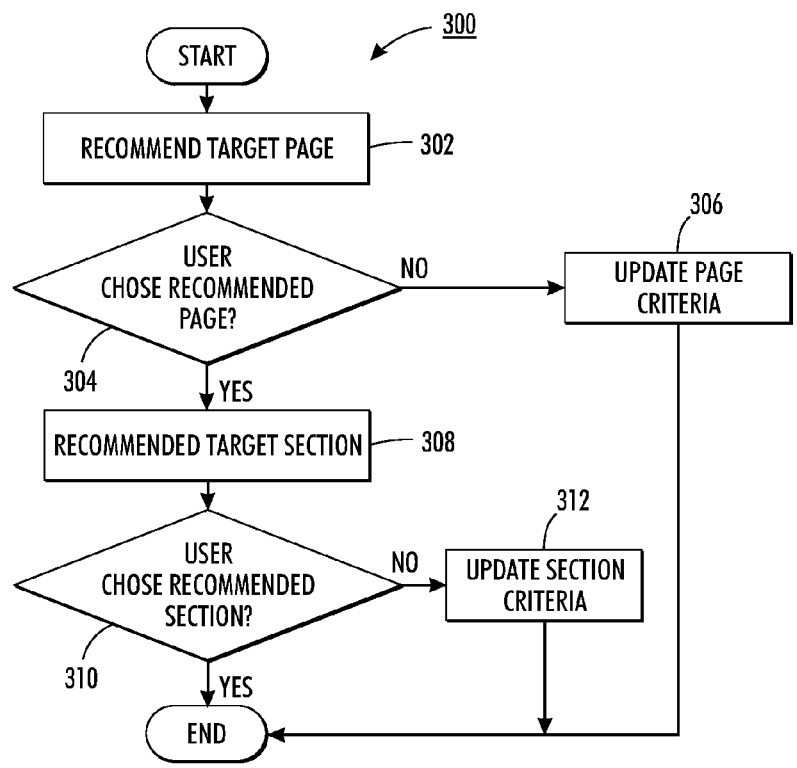
FIG. 3 is a flow diagram showing a method for improving the accuracy of recommendations of target content for use in the method of FIG. 2.

User interaction costs to contribute to target content 112, 116 are reduced through recommendation of relevant target content 112, 116. FIG. 3 is a flow diagram showing a method for improving the accuracy of recommendations of target content 112, 116 for use in the method of FIG. 2, in accordance with one embodiment. As the email client and wiki are integrated, contextual information for each user interaction across both can be stored as part of the user profile 128. The accuracy of recommendations is improved over time through implicit user feedback on the recommendations. For example, feedback is incrementally accumulated through each user interaction with the recommendations.

Recommendation criteria are initially based on standard information retrieval techniques, such as term frequency-inverse document frequency and Okapi BM25. The source content 110, 114 and target content 112, 116 are then compared for similarity and the target content 112, 116 satisfying the recommendation criteria are recommended, as discussed further above with reference to FIG. 2. However, the similarity measures can be improved over time by using a learning algorithm, such as the perceptron algorithm. Other learning algorithms are possible.

After the system recommends a target content page (block 302), whether the user has chosen the recommendation is determined (block 304). If the user has chosen the recommended page, the method continues. If the user does not choose the recommended page, the page recommendation criteria are modified or updated (block 306) so the user selected page is preferred in the future for similar source content 110, 114. For example, if the page "conference announcements" is selected for an email containing the description of a conference, such as CHI, and the user decides to create a page specific for the conference CHI, then the next time the user publishes an email containing information about the CHI conference, the wiki page called "CHI" will have a tendency to be recommended first compared to the formerly recommended page "conference announcements". Similarly, after the system recommends a target content section (block 308), whether the user has chosen the selection is determined (block 310). If not, the section recommendation criteria are updated (block 312) to favor the section actually chosen by the user. The recommendation criteria are stored as part of the user profile 128 for each user.

Figure 4:
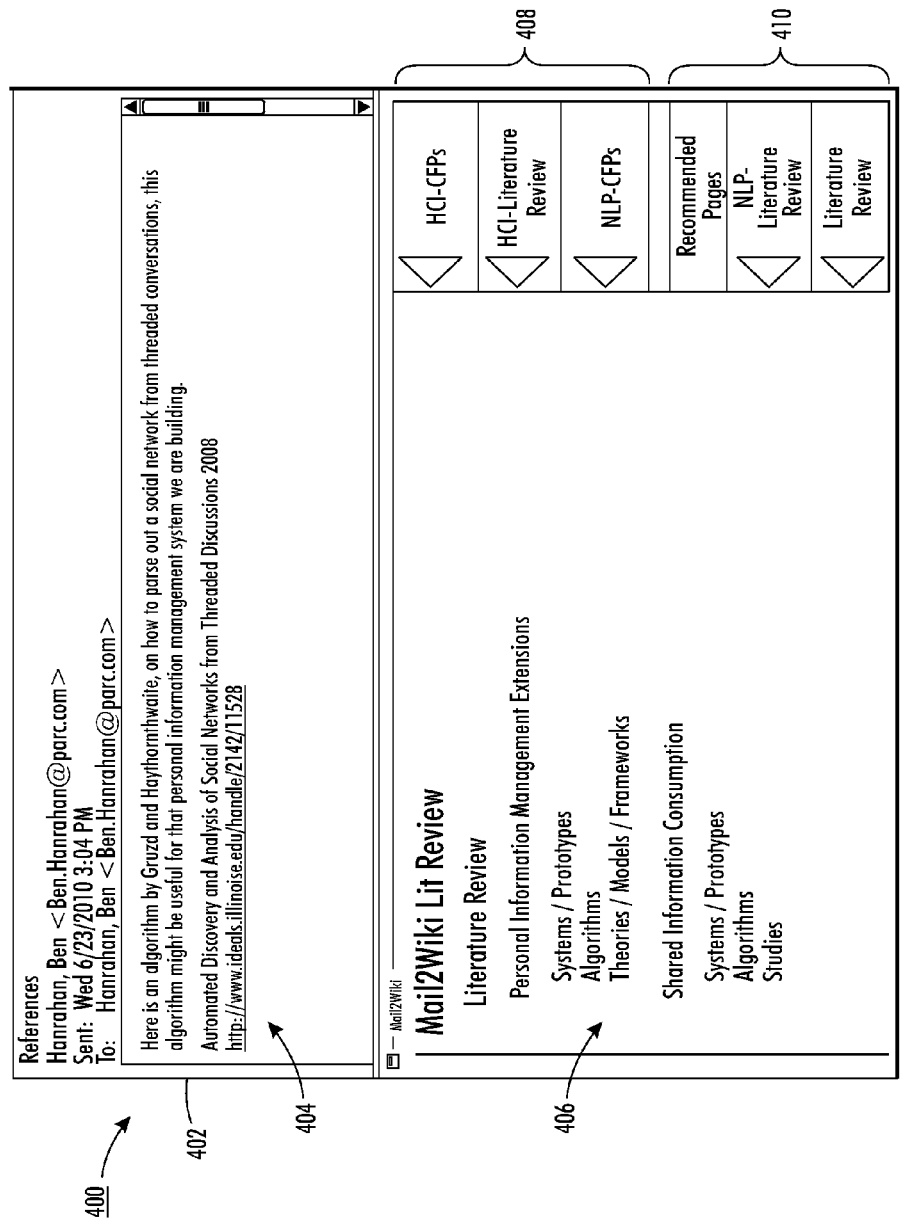
FIG. 4 is a screen shot diagram showing, by way of example, a user interface for supporting targeted sharing and early curation of information.

Target content 112, 116 is displayed within source content context for efficient user contribution and curation. FIG. 4 is a screen shot diagram 400 showing, by way of example, a user interface 402 for supporting targeted sharing and early curation of information. User interface 402 can be implemented within an email client enhanced with an email plugin. In a further embodiment, the user interface can be implemented in a Web-based form, such as in a Web browser, or any other type of software interface. The user interface 402 includes source content 110, 114 from a personal information repository and target content 112, 116 from a shared information repository. For example, the source content 110, 114 can be an incoming email message 404 selected by the user and the target content 112, 116 can be a wiki page 406. Other types of source 110, 114 and target content 112, 116 are possible. The user interface 402 also includes a target content selection bar that can contain preselected 408, or favorite, wiki pages and wiki pages recommended 410 as target content by the system.

Based on the content of the email message 404, the wiki pages "NLP-Literature Review" and "Literature Review" have been recommended to the user. The wiki page recommendations 410 are based on the entire content of the email message 404 as the user has not yet selected any content within the message 404. The user has selected the "Literature Review" wiki page, and the content of the wiki page 406 is displayed as a high-level outline. The user can select a heading in the outline to review further information contained under the heading to drill down into the target content, as further described below with reference to FIG. 6. In a further embodiment, the entire content of the wiki page is automatically displayed upon wiki page selection by the user.

Figure 5:
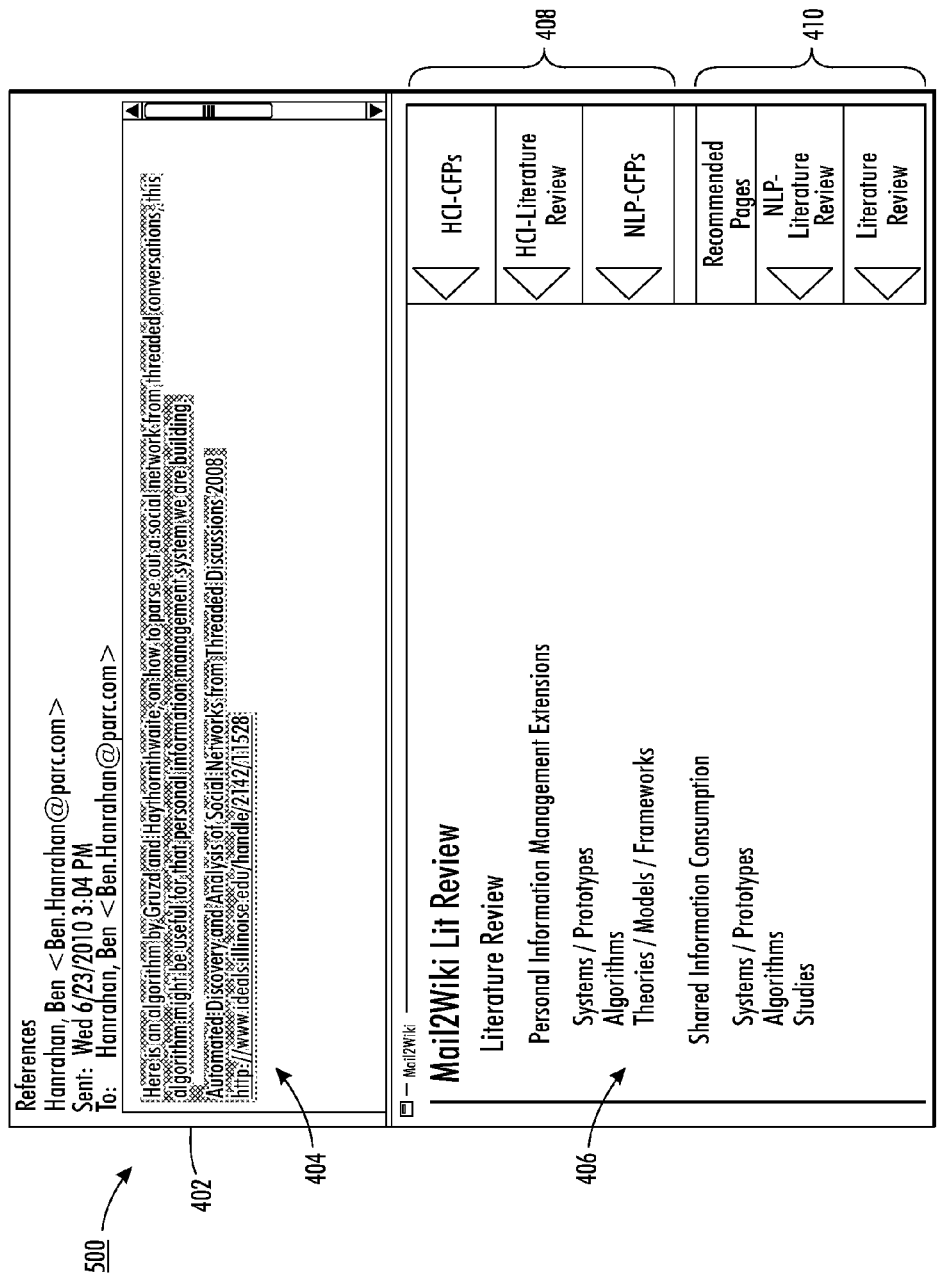
FIG. 5 is a screen shot diagram showing, by way of example, a user interface upon user selection of source content.

Source content 110, 114 is selected by the user for contribution to target content 112, 116. FIG. 5 is a screen shot diagram 500 showing, by way of example, a user interface 402 upon user selection of source content. The user can select source content in the email message 404 by interacting with the user interface, such as by highlighting text of the email message 404 with a mouse. The user can also create source content 110, 114, for example, by generating an outgoing email message (not shown). For example, the user has selected the entire content in the body of the email message 404. A recommendation for a particular section within the wiki page 406 for the selected content of the email message 404 can then be displayed to the user, as further discussed below with reference to FIG. 10.

Existing target content 112, 116 can be viewed prior to adding source content 110, 114. FIG. 6 is a screen shot diagram 600 showing, by way of example, a user interface 602 upon user selection of target content. A user can verify, or otherwise review, wiki page content 406 by selecting a header in the wiki page outline. The user has selected "Literature Review: Algorithms," which reveals the content nested under the header. The user can then review the existing content in the section and verify that the section does not already contain the selected source content.

Figure 7:
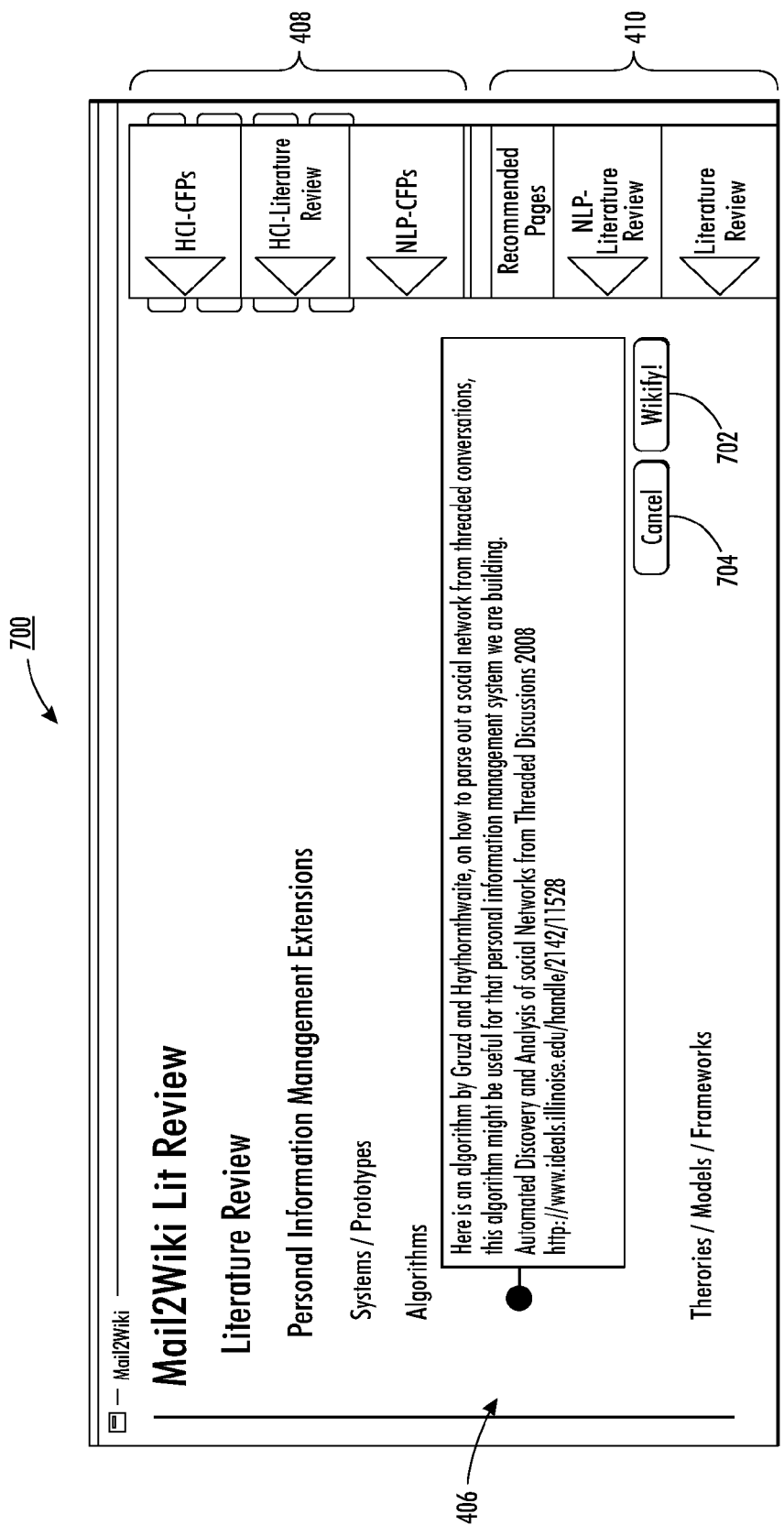
FIG. 7 is a screen shot diagram showing, by way of example, a user interface upon user placement of source content into target content.

A user adds source content 110, 114 to target content 112, 116 within the source content 110, 114 context. FIG. 7 is a screen shot diagram 700 showing, by way of example, a user interface 702 upon user placement of source content 110, 114 into target content 112, 116. Source content 110, 114 can be integrated with target content 112, 116 by the user through interacting with the user interface 702, for example, by dragging and dropping the selected source content 110, 114 from the email message 404 to the desired position within the target content 112, 116 of the wiki page 406. Once placed, the user can confirm the correct placement of the source content 110, 114 by depressing a "Wikify!" button icon 702, cancel the addition through the "Cancel" button icon 704, or move the source content 110, 114 to another section.

Figure 8:
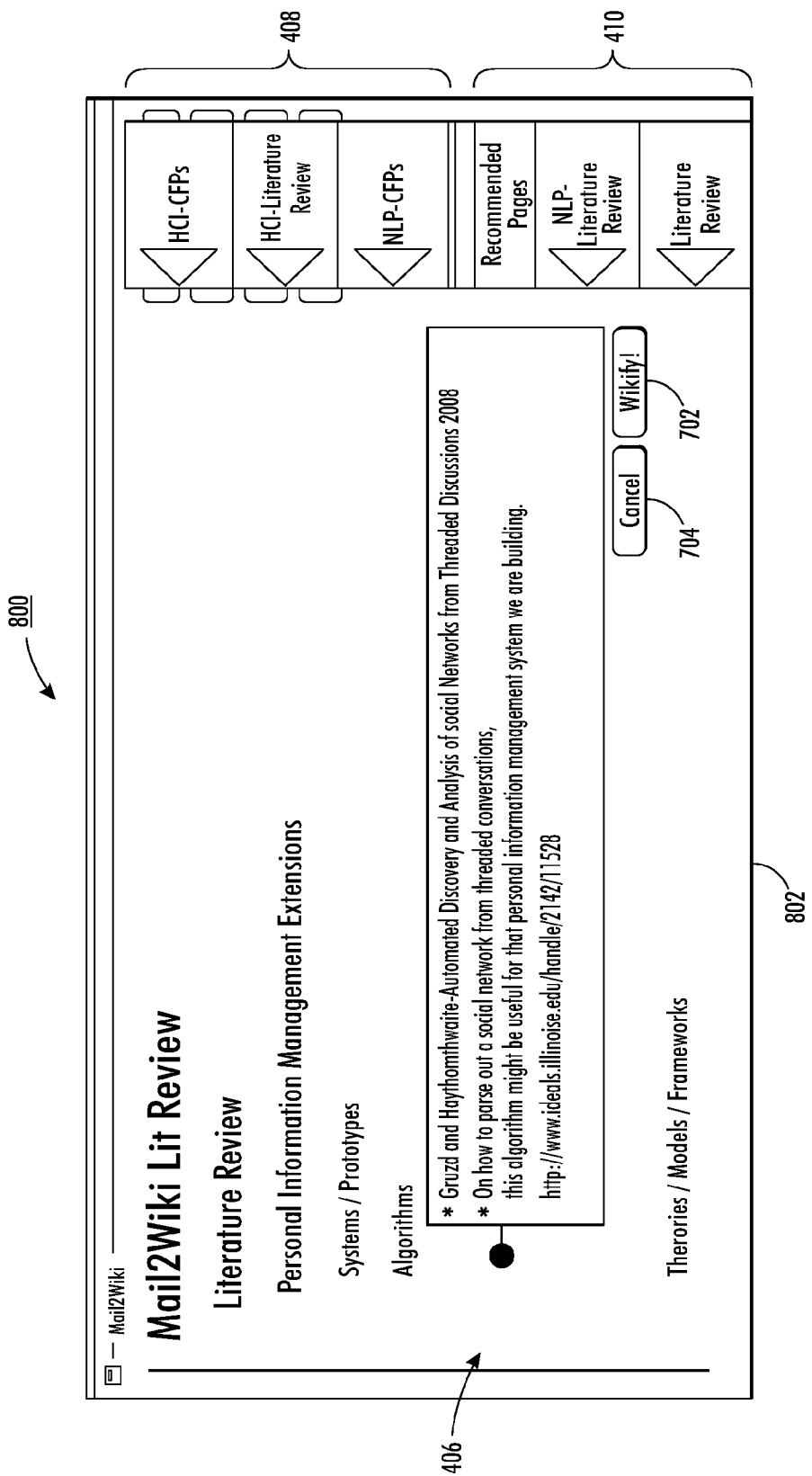
FIG. 8 is a screen shot diagram showing, by way of example, a user interface for editing placed source content.

Source content 110, 114 can be modified prior to finalized placement within the target content 112, 116. FIG. 8 is a screen shot diagram 800 showing, by way of example, a user interface 802 for editing placed source content 110, 114. Once the user has placed the source content 110, 114 from the email message 404 under the desired header, the user can make changes to the source content 110, 114, such as reordering, reformatting, adding, removing, or otherwise editing the source content 110, 114 prior to confirming placement. The changes can be conducted within and editing box 802 containing the source content 110, 114. Other ways of editing the source content are possible.

Figure 9:
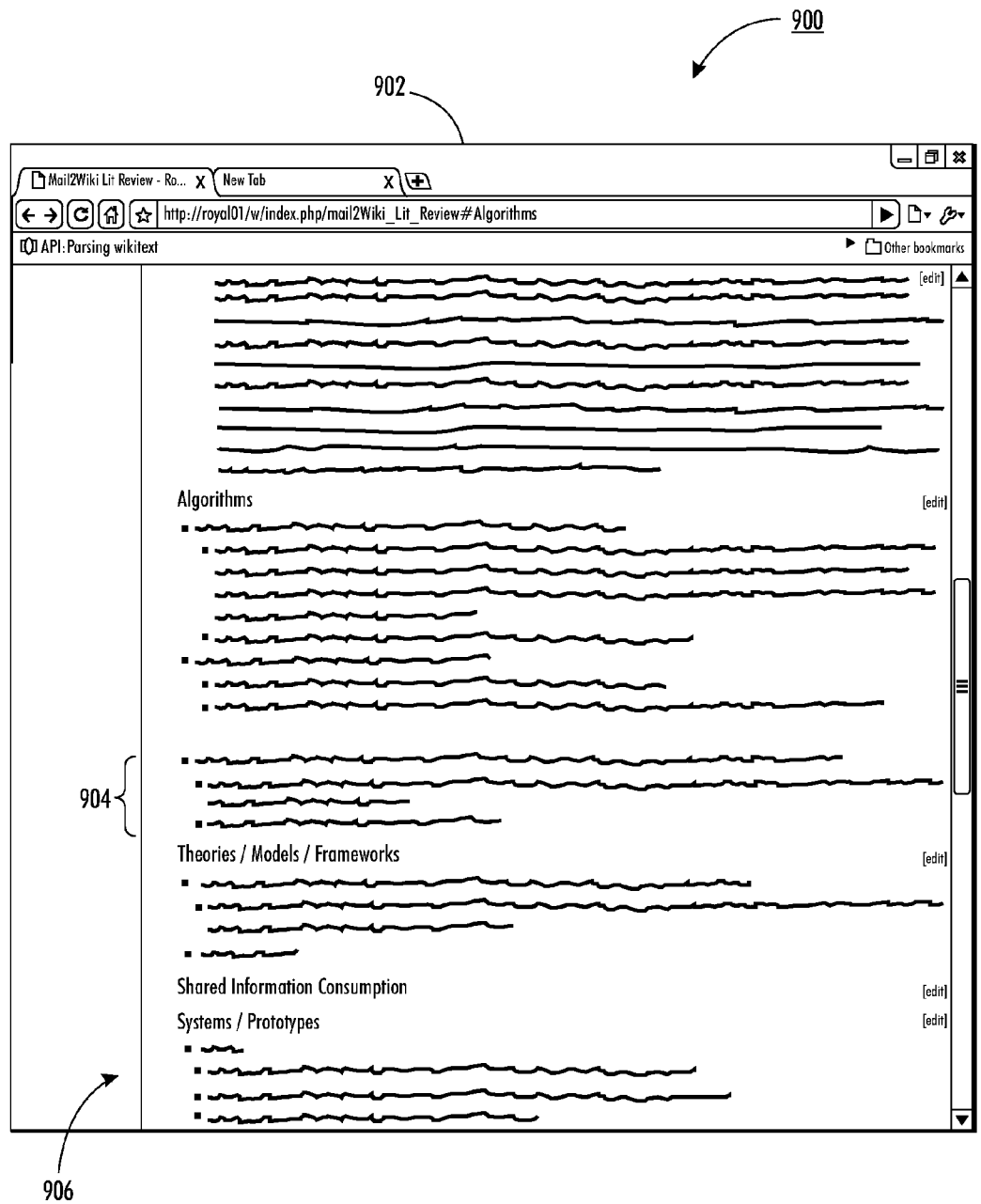
FIG. 9 is a screen shot diagram showing, by way of example, a Webpage with added source content.

Contributed source content 110, 114 is reflected in the updated target content 112, 116 in the shared information repository. FIG. 9 is a screen shot diagram 900 showing, by way of example, a Webpage 902 with added source content 110, 114. Once confirmed by the user, the source content 904 of the email message 404 contributed is reflected in the targeted content 112, 116 wiki page 906. The wiki page 906 includes the edited content of the selected email 404 and is available for display to other users. In one embodiment, the added source content 110, 114 is displayed in the same format as the target content 112, 116. In a further embodiment, the source content 110, 114 is displayed differently, such as through a different font, font size, or color.

Figure 10:
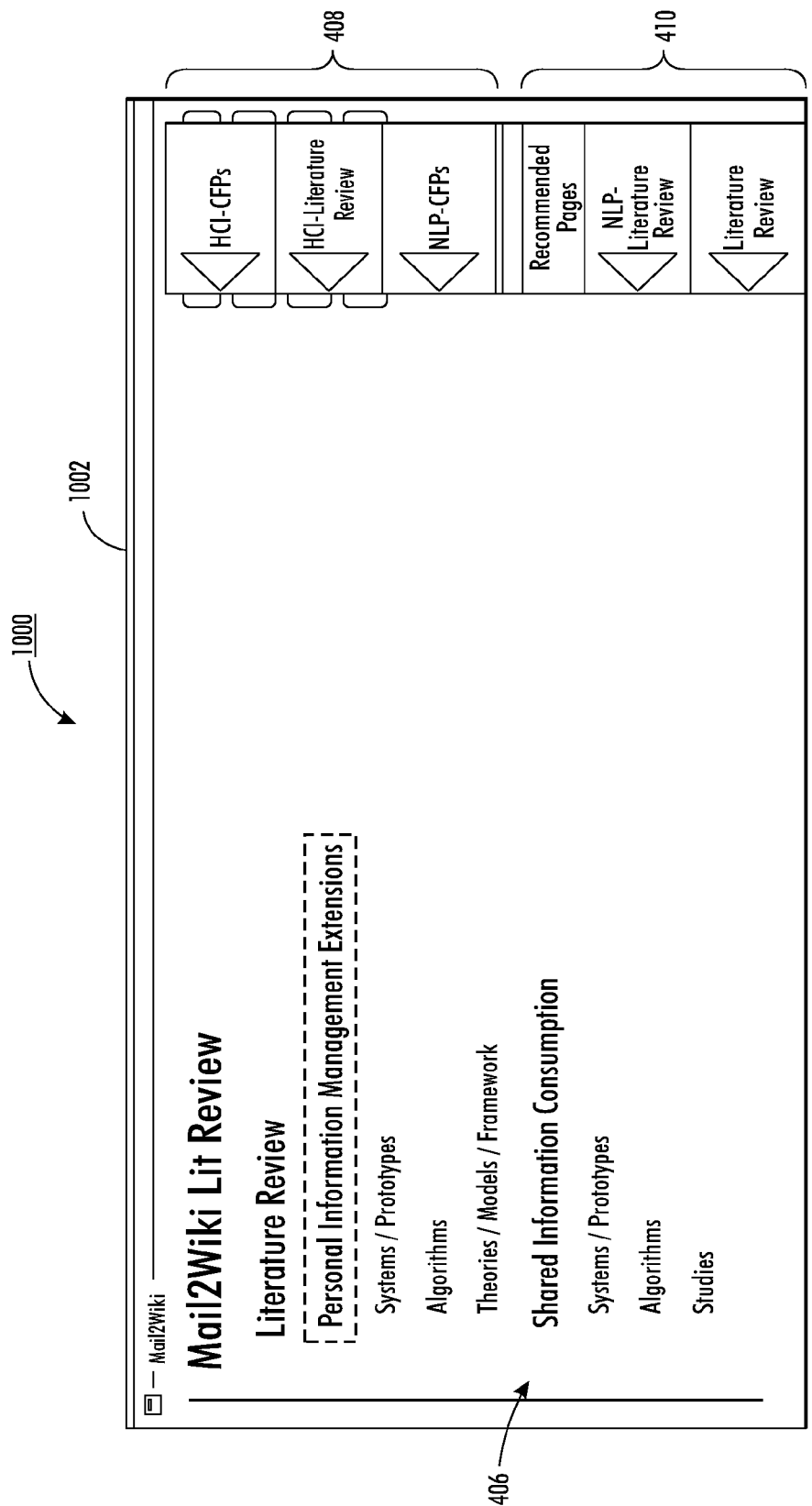
FIG. 10 is a screen shot diagram showing, by way of example, a user interface showing recommended placement of source content.

Recommendations for placement position of selected source content 110, 114 within the target content 112, 116 are generated for the user. FIG. 10 is a screen shot diagram 1000 showing, by way of example, a user interface 1002 showing recommended placement of source content 110, 114. The source content 110, 114 selected by the user is compared to the target content 112, 116 and the most relevant section within the target content 112, 116 for the selected source content 110, 114 is recommended to the user. The recommended section is brought to the attention of the user through the user interface. For example, the recommended section header of the wiki page 406 based on the selected content 110, 114 of the email message 404 can be highlighted, such as through a broken line around the section. Other ways to highlight the recommended section are possible, including, for example, different font size, color, and highlighting.

While the invention has been particularly shown and described as referenced to the embodiments thereof, those skilled in the art will understand that the foregoing and other changes in form and detail may be made therein without departing from the spirit and scope of the invention.

What is claimed is:

1. A system for supporting targeted sharing and early curation of information, comprising:
    a content module to identify a personal digital data item selection by a user within a personal information management client and data set that is unique to the user;
    a recommendation module to recommend from a shared information repository separate from the personal information management client, shared documents that are similar to the digital data item from the personal information management client and dataset, comprising:
        a criteria module to select recommendation criteria, to compare the personal digital data item from the personal information management client and dataset with a set of shared documents from the separate shared information repository, and to apply the recommendation criteria to the comparison of the personal digital data item and the set of documents; and
        a satisfaction module to identify one or more of the shared documents from the shared information repository that satisfy the recommendation criteria as the similar shared documents;
    a display module to display the similar shared documents visually proximate to the personal digital data item in the personal information client;
    an incorporation module to receive a selection of one of the similar shared documents and to incorporate the personal digital data item into the selected similar shared document in the shared information repository.

2. A system according to claim 1, further comprising:
a selection module to identify a selection of content within the personal digital data item, wherein the recommendation module further recommends a position within the selected similar shared document for the content.

3. A system according to claim 1, further comprising:
a similarity module to determine similarity measures for each of the personal digital data item and the one or more shared documents and to compare the similarity measures of the personal digital data item and the one or more shared documents, wherein the satisfaction module further identifies the one or more shared documents above a threshold as satisfying the recommendation criteria.

4. A system according to claim 1, further comprising:
a criteria adjustment module to identify user selections of recommended documents and to adjust the recommendation criteria from the identified user selections, wherein the criteria module further applies the adjusted recommendation criteria to later recommendations of shared documents.

5. A system according to claim 1, further comprising:
a criteria adjustment module to generate one of a new section or page within the selected similar shared document.

6. A computer-implemented method for supporting targeted sharing and early curation of information, comprising:
identifying a personal digital data item selected by a user within a personal information management client and data set that is unique to the user;
recommending from a shared information repository separate from the personal information management client, shared documents similar to the digital data item from the personal information management client and dataset, comprising:
selecting recommendation criteria;
comparing the personal digital data item from the personal information management client and dataset with a set of shared documents from the shared information repository;
applying the recommendation criteria to the comparison of the personal digital data item and the set of shared documents; and
identifying one or more of the shared documents from the shared information repository that satisfy the recommendation criteria as the similar shared documents;
displaying the similar shared documents visually proximate to the personal digital data item in the personal information client;
receiving a selection of one of the similar shared documents; and
incorporating the personal digital data item into the selected similar shared document in the shared information repository.

7. A computer-implemented method according to claim 6, further comprising:
identifying a selection of content within the personal digital data item; and
recommending a position within the selected similar shared document for the content.

8. A computer-implemented method according to claim 6, further comprising:
determining similarity measures for each of the personal digital data item and the one or more shared documents;
comparing the similarity measures of the personal digital data item and the one or more shared documents; and
identifying the one or more shared documents above a threshold as satisfying the recommendation criteria.

9. A computer-implemented method according to claim 6, further comprising:
identifying user selections of recommended documents;
adjusting the recommendation criteria from the identified user selections; and
applying the adjusted recommendation criteria to later recommendations of shared documents.

10. A computer-implemented method according to claim 6, further comprising:
generating one of a new section or page within the selected similar shared document.

11. A system for targeted sharing of information from an email message, comprising:
a content module to identify a personal email message selected by a user from an email message storage associated with an email client application;
a recommendation module to provide a recommendation of one or more shared wiki pages for the personal email message, comprising:
a similarity module to compare content of the personal email message with content of at least one shared wiki page and to determine those shared wiki pages that are most similar to the personal email message; and
a satisfaction module to apply recommendation criteria to the most similar shared wiki pages and to identify the most similar shared wiki pages that satisfy the threshold as the recommended wiki pages;
a display module to display the recommended wiki pages visually proximate to the personal email message in the email client application;
an incorporation module to receive a selection of one of the recommended wiki pages from the user and to incorporate the personal email message into the selected recommended wiki page in the shared storage.

12. A system according to claim 11, further comprising:
a selection module to receive a selection of a portion of the personal email message, wherein the recommendation module further recommends a position within the selected recommended wiki page that is similar to the portion of the personal email message; and
a position display module to display the position to the user.

13. A system according to claim 11, further comprising:
a selection module to receive a selection of a position within the selected recommended wiki page, wherein the incorporation module further updates the selected recommended wiki page at the position with the personal email message.

14. A system according to claim 13, further comprising:
a criteria adjustment module to adjust the recommendation criteria based on the selected position, wherein the similarity module further applies the adjusted recommendation criteria to later recommendations of shared wiki pages.

15. A system according to claim 11, wherein one of the recommended wiki pages is preselected by the user.

16. A computer-implemented method for targeted sharing of information from an email message, comprising:
identifying a personal email message selected by a user from an email message storage associated with an email client application;
providing a recommendation of one or more shared wiki pages for the personal email message, comprising:

comparing content of the personal email message with content of at least one shared wiki page;

determining those shared wiki pages that are most similar to the personal email message;

applying recommendation criteria to the most similar shared wiki pages and identifying the most similar shared wiki pages that satisfy the threshold as the recommended wiki pages;

displaying the recommended wiki pages visually proximate to the personal email message in the email client application;

receiving a selection of one of the recommended wiki pages from the user; and incorporating the personal email message into the selected recommended wiki page in the shared storage.

17. A computer-implemented method according to claim 16, further comprising:

receiving a selection of a portion of the personal email message; and recommending a position within the selected recommended wiki page similar to the portion of the personal email message; and displaying the position to the user.

18. A computer-implemented method according to claim 16, further comprising:

receiving a selection of a position within the selected recommended wiki page; and updating the selected recommended wiki page at the position with the personal email message.

19. A computer-implemented method according to claim 18, further comprising:

adjusting the recommendation criteria based on the selected position; and applying the adjusted recommendation criteria to later recommendations of shared wiki pages.

20. A computer-implemented method according to claim 16, wherein one of the recommended wiki pages is preselected by the user.

* * * * *